Figure 1:
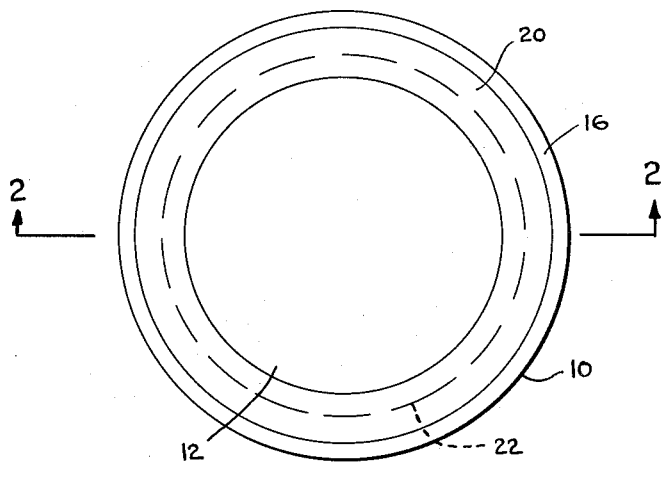

July 31, 1962 W. McCARTHY 3,047,782

CAPACITOR

Filed Nov. 13, 1958

INVENTOR.
WILLIAM McCARTHY
BY D. Emmett Thompson
Attorney

United States Patent Office 3,047,782
Patented July 31, 1962

3,047,782
CAPACITOR
William McCarthy, Syracuse, N.Y., assignor, by mesne assignments, to Speer Carbon Company, Inc., a corporation of Delaware
Filed Nov. 13, 1958, Ser. No. 773,760
4 Claims. (Cl. 317—258)

This invention relates to and has as an object a new and improved capacitor.

In many applications capacitors are required to withstand high electric voltages. A problem heretofore in this connection has been that when such voltages are applied the dielectric breakdown, or failure, tends to occur at the edge of the electrodes positioned on the opposite surfaces of the dielectric body, or blank, which forms the capacitor, thus indicating the presence of a higher electric stress along these edges than between other areas of the electrodes. Such a concentration of electric stress therefor often limits the voltage which may be safely applied to the capacitors to a fraction of the inherent electric strength of the dielectric material itself.

Briefly described, this invention consists in forming the capacitor of a dielectric blank and a pair of electrodes positioned on the opposite surfaces of the blank. The electrodes comprise a main portion having a high conductivity and a secondary portion positioned contiguous to the perimeter of the main portion and having a conductivity intermediate in value to that of the main portion and the dielectric blank. The secondary portion of the electrode may extend either partially or completely around the perimeter of the main portion.

The invention consists in the novel features and in the combinations and constructions hereinafter set forth and claimed.

In describing this invention, reference is had to the accompanying drawings in which like characters designate corresponding parts in all the views.

In the drawings—

Figure 2:
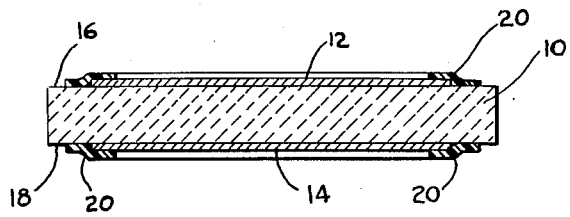

FIGURE 1 is a top plan view, greatly enlarged, of a preferred form of a capacitor embodying my invention, and FIGURE 2 is an exaggerated cross-sectional view taken on line 2—2 of FIGURE 1.

In the form shown in the drawings a capacitor which embodies my invention is made up of a dielectric disk, or blank 10 on the opposite surfaces of which the main portions, 12 and 14, of a pair of electrodes are positioned. The portions 12 and 14, as best seen in FIGURE 2, are, in the form shown, symmetrically positioned on the opposite surfaces 16 and 18 about the center line of the dielectric blank 10.

The secondary portion of the electrodes shown in the form of a torus, or ring 20, is positioned on each of the surfaces 16 and 18 a spaced distance inwardly from the outer edges thereof in a manner to overlap the contiguous edge portions, or peripheries of the main portions 12 and 14, as is shown in an exaggerated manner in FIGURE 2. The dash line 22, in FIGURE 1, indicates the outer peripheries of the main portions 12 and 14 which are overlapped by the secondary portion 20.

The dielectric blank, or disk 10, may be any of those generally used for electrical insulation, such as ceramics, plastics, papers, mica, etc. The main portions 12 and 14 of the electrodes may be made of any conductive material.

The secondary portions 20 of the electrodes may be formed of any material which is compatible with the dielectric blank 10, and which has the required conductivity intermediate that of the dielectric material and the main portions of the electrodes. Such materials may include, for example, plastic compositions impregnated with carbon fillers and the like.

In fabrication, the dielectric blank 10 may be formed by any suitable manner and the main portions 12 and 14 of the electrodes are applied to the dielectric blank in any well-known manner, such as screen printing, for example. Thereafter the blank with the main portions thereon may be fired and finally the secondary portions of the electrodes may be applied contiguous to the edge or perimeter of the main portions 12 and 14 by any suitable manner such as screen printing, or the like.

In practice a preferred embodiment of my capacitor comprises a ceramic dielectric disk or blank provided with electrodes comprising silver main portions on the top and bottom surfaces of the blank. The main portions of the electrodes are then provided with the semi-conductive secondary portions which may consist of a plastic composition impregnated with carbon and the secondary portions have a conductivity intermediate that of the main portions and the ceramic dielectric material. With such a construction it was found that by providing the capacitor with electrodes having a semi-conductive portion, in the manner previously described, the dielectric breakdown strength was increased over 50% of that of such capacitors formed without electrodes having the semi-conductive portions.

It is to be understood that the semi-conductive secondary portions may extend either partially or completely around the perimeter or marginal edges of the main portions of the electrodes. Further, the secondary portions may overlap, abut or merely be connected to the main portions of the electrodes.

Accordingly, it will be seen that by my invention I have provided a new and improved capacitor having a greatly improved dielectric breakdown strength.

What I claim is:

1. A capacitor comprising a dielectric blank, electrodes mounted on opposite side surfaces of the blank, at least one of said electrodes comprising a main portion and a secondary portion, said secondary portion being formed on the periphery of said main portion, such secondary portion having a conductivity intermediate that of the main portion and said blank.

2. The capacitor of claim 1, wherein each of said electrodes includes a main portion and a secondary portion having a conductivity intermediate that of the main portion and said blank and said electrodes are symmetrically positioned on the surfaces of said blank.

3. A capacitor in accordance with claim 2, wherein said secondary portions are in the form of a ring, partially overlying the perimeter of said main portions.

4. A capacitor in accordance with claim 3, wherein said blank is made up of a ceramic dielectric and said secondary portions consist of a plastic composition impregnated with carbon.

References Cited in the file of this patent

UNITED STATES PATENTS

| | | |
|---|---|---|
| 1,621,058 | Burger | Mar. 15, 1927 |
| 1,918,717 | Ruben | July 18, 1933 |
| 2,590,650 | Robinson | Mar. 25, 1952 |
| 2,598,707 | Matthias | June 3, 1952 |
| 2,668,936 | Robinson | Feb. 9, 1954 |

FOREIGN PATENTS

| | | |
|---|---|---|
| 160,620 | Australia | Feb. 4, 1954 |

UNITED STATES PATENT OFFICE
CERTIFICATE OF CORRECTION

July 31, 1962

Patent No. 3,047,782

William McCarthy

It is hereby certified that error appears in the above numbered patent requiring correction and that the said Letters Patent should read as corrected below.

In the grant, lines 2 and 3, for "assignor, by mesne assignments, to Speer Carbon Company, Inc., a corporation of Delaware," read -- assignor by mesne assignments, to Air Reduction Company, Incorporated, a corporation of New York, --; line 12, for "Speer Carbon Company, Inc., its successors" read -- Air Reduction Company, Incorporated, its successors --; in the heading to the printed specification, lines 3 to 5, for "assignor, by mesne assignments, to Speer Carbon Company, Inc., a corporation of Delaware" read -- assignor, by mesne assignments, to Air Reduction Company, Incorporated, a corporation of New York --.

Signed and sealed this 11th day of December 1962.

(SEAL)
Attest:
ERNEST W. SWIDER
Attesting Officer

DAVID L. LADD
Commissioner of Patents